United States Patent
Zhang et al.

(10) Patent No.: US 8,250,521 B2
(45) Date of Patent: Aug. 21, 2012

(54) METHOD AND APPARATUS FOR THE DESIGN AND DEVELOPMENT OF SERVICE-ORIENTED ARCHITECTURE (SOA) SOLUTIONS

(75) Inventors: Liang-Jie Zhang, Cortlandt Manor, NY (US); Jia Zhang, DeKalb, IL (US)

(73) Assignee: International Business Machines Corporation, Armonk, NY (US)

( * ) Notice: Subject to any disclaimer, the term of this patent is extended or adjusted under 35 U.S.C. 154(b) by 1284 days.

(21) Appl. No.: 11/956,735

(22) Filed: Dec. 14, 2007

(65) Prior Publication Data

US 2009/0158237 A1 Jun. 18, 2009

(51) Int. Cl.
G06F 9/44 (2006.01)
G06Q 10/00 (2012.01)

(52) U.S. Cl. .......................... 717/104; 705/1.1; 717/100

(58) Field of Classification Search .......... 717/100–105; 705/1.1
See application file for complete search history.

(56) References Cited

U.S. PATENT DOCUMENTS

| | | | |
|---|---|---|---|
| 6,550,057 B1 * | 4/2003 | Bowman-Amuah | 717/101 |
| 7,114,146 B2 * | 9/2006 | Zhang et al. | 717/106 |
| 7,139,999 B2 * | 11/2006 | Bowman-Amuah | 717/100 |
| 7,606,803 B2 * | 10/2009 | Bou-Ghannam et al. | 705/1.1 |
| 7,761,885 B2 * | 7/2010 | Labrou et al. | 719/330 |
| 7,814,226 B2 * | 10/2010 | Patrick | 709/238 |
| 7,823,125 B2 * | 10/2010 | Batabyal | 717/102 |
| 8,069,435 B1 * | 11/2011 | Lai | 717/106 |
| 8,117,280 B2 * | 2/2012 | Masuouka et al. | 709/218 |
| 2001/0052108 A1 * | 12/2001 | Bowman-Amuah | 717/1 |
| 2004/0220910 A1 * | 11/2004 | Zhang et al. | 705/1 |
| 2005/0223109 A1 | 10/2005 | Mamou et al. | |
| 2005/0246726 A1 * | 11/2005 | Labrou et al. | 719/328 |
| 2006/0047742 A1 | 3/2006 | O'Neill et al. | |
| 2006/0069995 A1 * | 3/2006 | Thompson et al. | 715/700 |
| 2006/0143229 A1 * | 6/2006 | Bou-Ghannam et al. | 707/104.1 |
| 2007/0011126 A1 * | 1/2007 | Conner et al. | 706/47 |
| 2007/0033590 A1 * | 2/2007 | Masuouka et al. | 719/313 |
| 2007/0105589 A1 | 5/2007 | Lu | |
| 2007/0143474 A1 | 6/2007 | Sheng et al. | |
| 2007/0288275 A1 * | 12/2007 | Kumar | 705/7 |
| 2008/0028365 A1 * | 1/2008 | Erl | 717/105 |
| 2008/0052664 A1 * | 2/2008 | Batabyal | 717/104 |
| 2008/0069124 A1 * | 3/2008 | Patrick | 370/401 |
| 2008/0082569 A1 | 4/2008 | Mansour et al. | |

(Continued)

OTHER PUBLICATIONS

Arsanjani, Ali, Liang-Jie Zhang, Michael Ellis, Abdul Allam, and Kishore Channabasavaiah. "S3: A Service-Oriented Reference Architecture," May-Jun. 2007, IEEE IT Pro. pp. 10-17.*

(Continued)

Primary Examiner — Chameli C. Das
Assistant Examiner — Erika Kretzmer
(74) Attorney, Agent, or Firm — Cantor Colburn LLP; Louis Percello

(57) ABSTRACT

A method is provided for designing and developing a service-oriented architecture (SOA) solution that comprises implementing a business process layer having a first set of architectural building blocks (ABBs) and configured to perform service composition and service decomposition; implementing a service component layer having a second set of ABBs and configured to perform service integration and service invocation; implementing a service layer having a third set of ABBs and configured to perform service discovery; and service aggregation; integrating the business process layer, the service component layer, and the service layer; and specifying a set of characteristics of the first, second, and third sets of ABBs to be reconfigurable based upon extensible rules.

3 Claims, 7 Drawing Sheets

U.S. PATENT DOCUMENTS

2008/0103786 A1* 5/2008 Zhang et al. ..................... 705/1

OTHER PUBLICATIONS

Keen, Martin, Amit Acharya, Susan Bishop, Alan Hopkins, Sven Milinski, Chris Nott, Rick Robinson, Jonathan Adams, Paul Verschueren. "Patterns: Implementing an SOA Using an Enterprise Service Bus," Jul. 2004, IBM Redbooks, first edition, part SG24-6346-00. pp. 3-31.*

Zhang, Liang-Jie, Abdul Allam, and Cesar A Gonzales. "Service-Oriented Order-to-Cash Solution with Business RSS Information Exchange Framework," Sep. 18, 2006, IEEE International Conference on Web Services (ICWS'06), pp. 1-8.*

Zhang, Liang-Jie, Tian Chao, Henry Chang, and Jen-Yao Chung. "Automatic Method Signature Adaptation Framework for Dynamic Web Service Invocation" Jul. 14-18, 2002. 6th World Multi Conference on Systemics, Cybernetics and Informatics (SCI 2002), Orlando, Fla., pp. 541-546.*

Liang-Jie Zhang et al.; "Requirements Driven Dynamic Services Composition for Web Services and Grid Solutions;" Journal of Grid Computing 2; 2004; 121-140.

Liang-Jie Zhang et al.; "Web Services Relationships Binding for Dynamic e-Business Integration," International Conference on Internet Computing (IC'02), pp. 561-567, Jun. 2002.

Jia Zhang et al.; "Web Services Quality Testing", International Journal of Web Services Research, Apr.-Jun. 2005, 2(2), pp. 1-4.

Superceded: Web Services Resource Framework; [online]; [retrieved on Jun. 2, 2009]; retrieved from the Internet http://www.ibm.com/developerworks/library/specification/ws-resource/ws-resource/.

John Y. Sayah et al.; "On-demand business collaboration enablement with web services;" Decision Support Systems 40; 107-127, 2005, Available online Jun. 19, 2004.

Notice of Allowance and Issue Fee for U.S. Appl. No. 11/956,741; Filing Date: Dec. 14, 2007; First Named Inventor: Liang-Jie Zhang; Art Unit: 2452; Mail Date: Jan. 9, 2012.

Notice of Allowance and Issue Fee Due for U.S. Appl. No. 11/956,741; Filing Date: Dec. 14, 2007; First Named Inventor: Liang-Jie Zhang; Art Unit: 2452; Mail Date: Feb. 3, 2012.

Office Action—Non-Final for U.S. Appl. No. 11/956,741; Filing Date: Dec. 14, 2007; First Named Inventor: Liang-Jie Zhang; Art Unit: 2452; Mail Date: Sep. 15, 2011.

* cited by examiner

METHOD AND APPARATUS FOR THE DESIGN AND DEVELOPMENT OF SERVICE-ORIENTED ARCHITECTURE (SOA) SOLUTIONS

BACKGROUND OF THE INVENTION

1. Field of the Invention

Exemplary embodiments of the present invention relate to software architectural models, and more particularly, to service-oriented architecture models.

2. Description of Background

A software architectural model is generally a set of components, connectors, constraints, containers, and configurations that provides reference architectural patterns and styles for a system. In recent years, the decoupling of interface from implementation at the programming level has become a popular architectural approach because such decoupling facilitates the creation of complex systems required by today's business applications. According to this approach, the interface of a service consumed by a service consumer is loosely coupled with its implementation by a service provider. This style has become the key characteristic of Service-Oriented Architecture (SOA); that is, rather than the implementations of components being exposed and known, only the service interfaces provided are published and consumers are insulated from the details of the underlying implementation by a provider or broker.

By providing a paradigm for organizing and utilizing distributed capabilities that may be under the control of different ownership domains, SOA allows business and IT convergence through agreement on a set of business-aligned IT services that collectively support an organization's business processes and goals. Not only does it provide flexible, decoupled functionality that can be reused, but it also provides the mechanisms to externalize variations of quality of service; for example, in declarative specifications such as WS-Policy and related standards. Nevertheless, although SOA solutions have become a prominent topic in the modern business world, the design and development for SOA solutions is still carried out on an ad hoc basis, rather than in a systematic manner. Because of this, the establishment of an effective business-aligned service model to guide and facilitate the design, development, and management of highly reusable services and service components has remained a challenge.

In the preceding fifty years of software engineering development, an abundance of architectural models have been developed for use in guiding the design and development of traditional software applications. Nevertheless, due to the unique features of SOA requirements, the direct application of these architectural models to the SOA solution design and development process has encountered significant challenges. From the perspective of designing an integrated service model that addresses the linkage between business and IT, existing software application focused architectural models do not sufficiently encompass SOA-related needs such as, for example, the need for the system provided in an SOA solution to be centered around reusable services instead of specific software components, the need for an SOA solution to be adaptable to ever changing business requirements, etc.

Presently, the most well-known and widely accepted SOA architectural model that provides an underlying backbone for the creation, registration, and discovery of interface-exposed services is the triangular conceptual model. As illustrated in FIG. 1, an SOA triangular model 100 identifies three roles according to their behaviors and responsibilities over a service: a service provider 110, which offers services, a service requester 120, which invokes services, and a service registry 130, which helps service requestors to find service providers for proper services. More specifically, a service provider operates to publish services at a service registry, a service requestor queries the service registry for services in which it is interested and then connects to the corresponding service providers to invoke the services, and a service registry operates to register and organize published services and to provide search services.

Following the SOA triangular model, a new application may be developed initially for publication as a Web service into a service registry; alternatively, an existing software application, regardless of whether it is a packaged application, a customer application, or a legacy system, may be wrapped with a service-compliant interface and then published as a Web service. The encapsulated application in a Web service may comprise components at any granularity (which refers to the size and/or descriptions of the components that make up a system—systems of, or description in terms of, large components are called coarse-grained, and systems of small components are called fine-grained), ranging from a single application component to a comprehensive large-scale software product encompassing many components and other software products. Based upon this service model, a number of service wrapping and development platforms such as IBM's WebSphere and BEA's WebLogic, as well as a myriad of open-source software products, have been implemented and widely used in the market.

Nevertheless, a major drawback of the current triangular conceptual model is that it is too high level to adequately facilitate enterprise-level SOA solution design and development. Its application does not provide normative guidance on how to build a prototype of an SOA-enabled service. The triangular model also does not identify and address service handling-related issues such as decomposition, aggregation, transformation, and invocation in a systematic manner. Furthermore, because the triangular concept only models a very high-level system view that remains coarse-grained, SOA solution architects employing the model are forced to design component models for each service from scratch based upon personal knowledge and experience. This ad hoc approach can waste valuable human resources, result in schedule delays, and suffer from low reusability. Moreover, because the SOA triangular model handles reusable services at a coarse granularity, it does not support flexible and extensible business scenarios. The current triangular model does not provide architecture-level support for configuration and re-configuration of services and service components, and an SOA solution that is based upon the triangular model does not provide the adaptability needed to make run-time evolutionary changes.

Accordingly, it is desirable to create a fine-grained service model with the flexibility and extensibility to enable and support solution-level business service design and implementation in a systematic and unified manner.

SUMMARY OF THE INVENTION

The shortcomings of the prior art can be overcome and additional advantages can be provided through exemplary embodiments of the present invention that are related to a method for designing and developing an SOA solution. The method comprises implementing a business process layer having a first set of architectural building blocks (ABBs) and configured to perform service composition and service decomposition; implementing a service component layer having a second set of ABBs and configured to perform service integration and service invocation; implementing a service layer having a third set of ABBs and configured to perform service discovery and service aggregation; integrating the business process layer, the service component layer, and the service layer; and specifying a set of characteristics of the first, second, and third sets of ABBs to be reconfigurable based upon extensible rules.

The shortcomings of the prior art can also be overcome and additional advantages can also be provided through exemplary embodiments of the present invention that are related to computer program products and data processing systems corresponding to the above-summarized method are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that can be implemented to provide an integrated service model that can be applied and customized to develop reusable, flexible, and extensible SOA services and solutions for one or more lines of business. Exemplary embodiments can thereby provide a high-level abstraction of an SOA that can be configured and customized into an SOA solution that is based upon specific business requirements and can be directly delivered as architectural templates for the actual solution development to a corresponding development team. Exemplary embodiments can be employed, for instance, by software engineers to design the software architecture for enterprise-level SOA business services and solutions.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Figure 1:
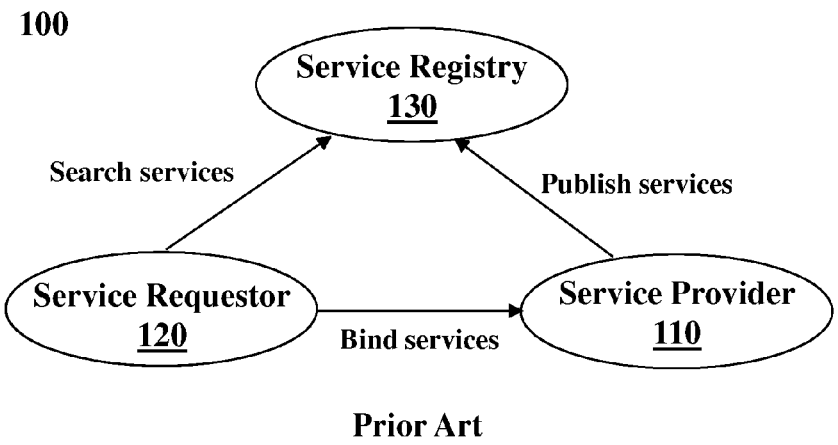
FIG. 1 is a block diagram illustrating a general embodiment of the SOA triangular architectural model.
Figure 2:
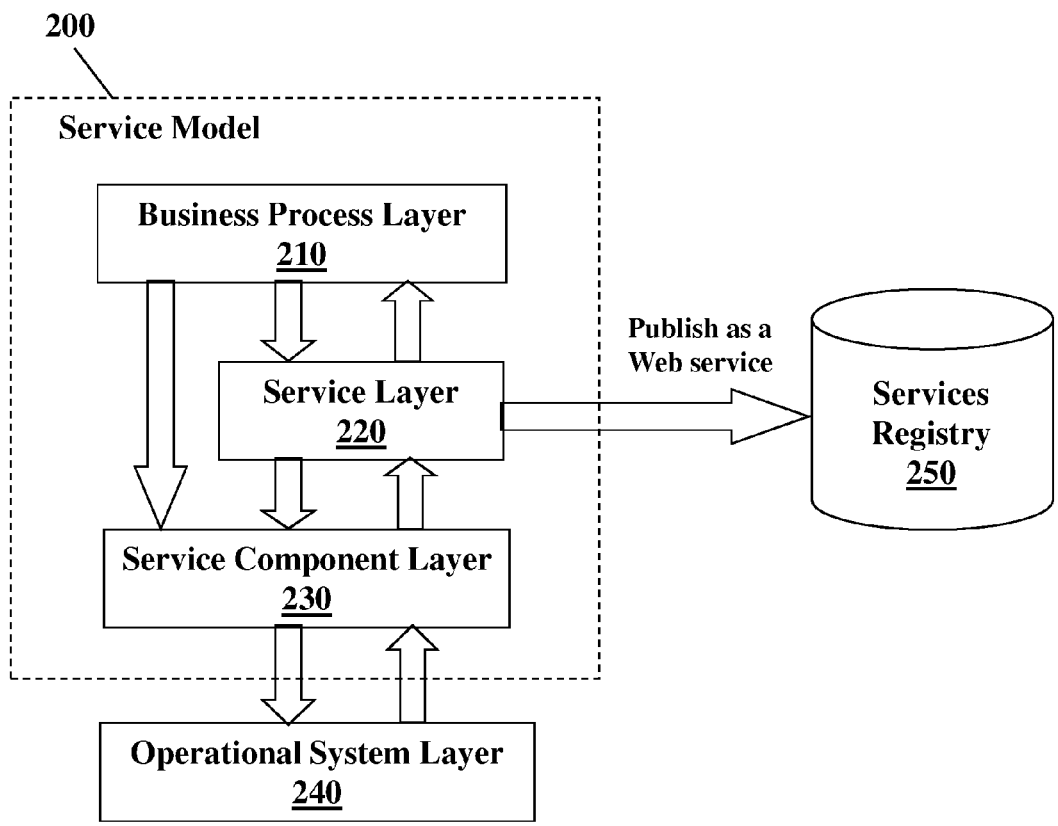
FIG. 2 is a block diagram illustrating an exemplary embodiment of an integrated service model in accordance with the present invention.

Exemplary embodiments of the present invention can be implemented to provide an integrated, logically grouped and layered service model for an SOA solution that aligns business with IT and utilizes configurable and reconfigurable fine-grained architectural building blocks (ABBs). More particularly, exemplary embodiments can be implemented to utilize multi-granular logical architectural components that are associated with ABBs and their configurable attributes, relationships, dependencies, constraints, and interaction patterns to afford a fine-grained architectural service model that is capable of guiding and facilitating the rapid creation of integrated business and IT services at the enterprise level. In exemplary embodiments, the relationships and interaction patterns between ABBs within and across layers of the service model can be predefined or specified to be configurable and reconfigurable based on extensible rules, thereby enabling inter-relationships between ABBs in the service model to be adaptable to evolutionary changes, such as those imposed by ever changing business requirements, either at design time or run time. The ABBs in each logical layer of the model can be fine grained based upon industry best practices and the concepts of Object-Oriented Design, Component-Based Software Engineering, and SOA, and these ABBs can provide guidance for an SOA solution architect to rapidly configure and develop a flexible and extensive prototype of a service middleware system that can be employed to bridge business and IT. Furthermore, the configurability and re-configurability provided by the integrated service model can aid in providing dynamic alignment of business needs with IT environments. Referring now to FIG. 2, an exemplary embodiment of an integrated service model in accordance with the present invention is illustrated. Integrated service model 200 provides for ABBs, interaction patterns, and configuration management in three logical layers: a Business Process layer 210, a Service layer 220, and a Service Component layer 230. This business and IT aligned service model can support higher flexibility, extensibility, and adaptability by decoupling a service into three different perspectives of business logic, interface, and implementation. Business logic-related service composition and decomposition is managed by Business Process layer 210, implementation-related service integration and invocation is managed by Service Component layer 230, and interface-related (for example, Web Services Description Language (WSDL)-related) service location and aggregation is managed by Service layer 220, which is in communication with a services registry 250.

In the present exemplary embodiment, as illustrated in FIG. 2, service model 200 is configured to be implemented on top of an Operational System layer 240 which includes all customer or packaged application assets in the application portfolio running in an IT operating environment supporting business activities. Operational System layer 240 may contain, for example, existing packaged applications (applications typically provided by individual service vendors (ISVs)), customer applications (applications developed in-house or to-be-developed), and legacy systems (existing applications typically developed in traditional technologies). Traditionally, these types of applications could only be used for a single purpose to serve a specific user. In the present exemplary embodiment, however, these application can be exposed as services with standard interfaces so that they can be reused by other upper-level services.

Business Process layer 210 can be implemented to leverage Service layer 220 to quickly compose and choreograph services, and also to coordinate business processes to fulfill customer requirements. More specifically, Business Process layer 210 can perform this process-level handling in three dimensions or directions: from the top-down, from the bottom-up, and horizontally. In the top-down direction, Business Process layer 210 can provide facilities for decomposing business requirements into patterns of activity flow that can each be realized by employing existing business processes, services, and service components. In the bottom-up direction, Business Process layer 210 can provide facilities for composing existing business processes, services, and service components into new business processes. In the horizontal direction, Business Process layer 210 can provide for services-oriented collaboration control between business processes, services, and service components.

It should be noted that in the present exemplary embodiment, Business Process layer 210 is not implemented to focus on individual business process representation, which can be fulfilled instead by workflow description languages such as Business Process Execution Language for Web Services (BPEL4WS). Rather, Business Process layer 210 is implemented to focus on the building of SOA solutions using business processes. For example, Business Process layer 210 may be configured, in the bottom-up direction, to aggregate ten existing business processes into three larger processes while handling control of the collaboration between them in the horizontal direction. In the top-down direction, Business Process layer 210 can be configured to first decompose a business process into smaller tasks, and then map each task into service clusters (that is, groups of loosely coupled conceptual services) that can be realized by actual Web services provided in Service layer 220. In other words, Business Process layer 210 provides facilities for decomposing a business process into conceptual services that fulfill business functions. These service clusters will be discussed in greater detail below with reference to the Service layer.

In the present exemplary embodiment, Service layer 220 is configured to provide a comprehensive logical layer that enables and facilitates service registration, decomposition, discovery, binding, and aggregation, as well as service life cycle management, by leveraging the concept of a Web service cluster. The concept of a Web service cluster is described in "Requirements Driven Dynamic Services Composition for Web Services and Grid Solutions" (Liang-Jie Zhang, Bing Li,-J. Grid Comput. 2(2):121-140, 2004), which is incorporated herein by reference thereto. Generally, a Web service cluster can refer to a collection or category of Web services that serve a common business function. These Web services may be published by different service providers and differ from each other in terms of specific features. In exemplary embodiments, services in Service layer 220 can be categorized into service clusters based upon certain business functions such as, for example, reporting services and purchase order management services. As an analogy, viewing a generic shipping service as a conceptual service cluster, there are several service providers (for example, UPS, USPS, and FedEx) that can be individually invoked to provide the same shipping purpose. Each service provider may also provide a variety of shipping services with different time frames and guarantees. For example, a UPS service may provide overnight delivery, 2-day delivery, 3-day delivery, 5-day delivery, and 1-week delivery, and the sum of these shipping services can be viewed as a conceptual shipping service cluster.

By logically maintaining each service in Service layer 220, a business process is able to benefit by concerning itself with the level of service clusters rather than individual services. For instance, by leveraging the concept of a service cluster in a situation where a selected Web service becomes unavailable at invocation time, the selected service can be replaced by another available Web service in the same Web service cluster without requiring knowledge by the users of the corresponding business process.

In exemplary embodiments, Service layer 220 can be configured to perform both top-down and bottom-up service-level handling. In the top-down direction, Service layer 220 can provide facilities for locating actual Web service interfaces for business processes. The top-down mapping from business processes into real Web services is thereby handled by Service layer 220. As described above, Business Process layer 210 is configured to decompose and map a business process into service clusters. Then, for each service cluster identified in this manner, Service layer 220 is responsible for finding the appropriate service provider and service consumer, determining where the target service resides and accumulating other requirements such as access control, and binding to the target Web service interface.

In the bottom-up direction, Service layer 220 can provide facilities for externally exposing Web service interfaces to service components. It should be noted that different service interfaces may be exposed to one service component in different formats. For instance, in the exemplary configuration of integrated service model 200 illustrated in FIG. 3, a service component 232 in Service Component layer 230 is exposed to four service interfaces 222, 224, 226, and 228 in Services layer 220. In other words, as defined in Services layer 220, one service component may be represented within service model 200 as multiple service interfaces in a one-to-many relationship. Therefore, in exemplary embodiments, the number of services in Service layer 220 may exceed the number of service components in Service Component layer 230, and multiple service components may be implemented within a wrapper in the Service Component layer that provides the interface defined by the Service layer.

Figure 3:
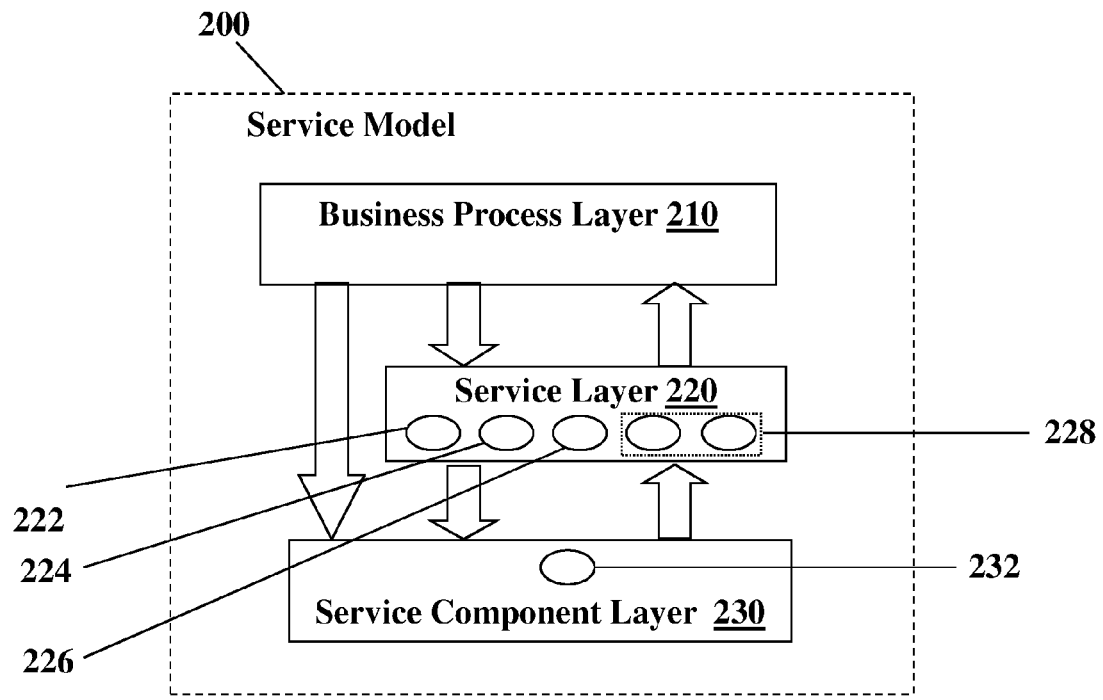
FIG. 3 is a block diagram illustrating an exemplary embodiment of a configuration of the exemplary integrated service model illustrated in FIG. 2.
Figure 4:
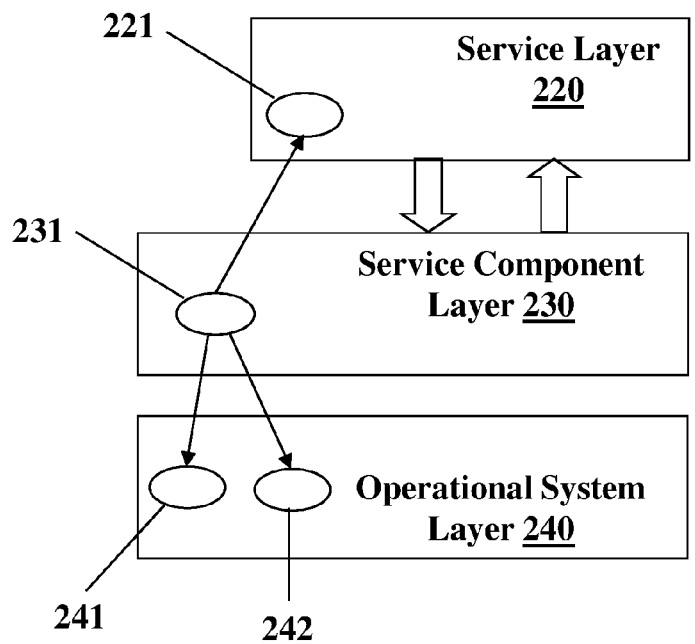
FIG. 4 is a block diagram illustrating an exemplary embodiment of a partial configuration of the exemplary integrated service model illustrated in FIG. 2.

In exemplary embodiments, Service layer 220 can also be configured to perform high-level service aggregation at the interface level. For example, FIG. 3 illustrates two different categories of services: individual services provided by interfaces 222, 224, and 226, which are atomic services that do not depend on other services, and a composite service provided by interface 228, which is an aggregate service that depends upon more than one individual service. A composite service comprises more than one service interface in Service Component layer 230; otherwise, it would be considered an individual service. For example, as shown in FIG. 4, an exemplary service 221 is provided by Service layer 220 and implemented by a single service component 231 in Service Component layer 230. Single service component 231 is, in turn, implemented by two legacy systems 241, 242 in Operational System layer 240. Because exemplary service 221 involves only one service (or service interface) from Service layer 220, the exemplary service is considered an individual service. Each composite service has a composite interface and a corresponding single technical service component in Service Component layer 230 to implement the aggregation of individual services. The service component can invoke more than one service in the Service layer and/or other technical component(s) such as SAP or legacy systems.

Figure 5:
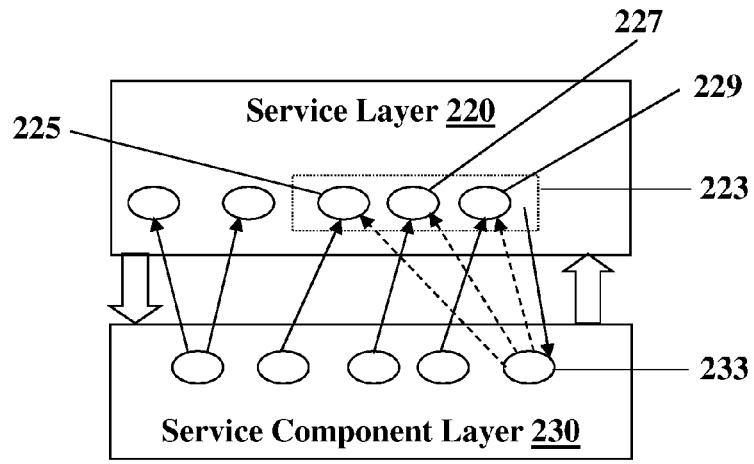
FIG. 5 is a block diagram illustrating an exemplary embodiment of a configuration of the exemplary integrated service model illustrated in FIG. 2.

FIG. 5 illustrates an exemplary embodiment of a composite service, stock service 223. In this example, three individual services exist: stock quote 225, stock sell 227, and stock buy 229, each of which represents a single stock-related activity (quote a stock price, sell a stock, and buy a stock, respectively). Each of these services is wrapped from a corresponding service component in Service Component layer 230 within stock service 223, which aggregates the three individual services into the composite service stock service with a new service interface. Stock service 223 has a corresponding single technical service component 233 in Service Component layer 230 to implement the interface aggregation for invoking the three services (service interfaces) from Service layer 220. It should be noted that the manner of service aggregation illustrated in this example is based upon interfaces only (for example, involving some packaging) and does not involve business logic. In the exemplary embodiments shown in FIG. 5, control flow is not provided between the three aggregated services, and each of the three services may become a separate operation of the aggregated WSDL interface.

It should be noted that the term "aggregation" is used to describe the service aggregation performed for composite services in Service layer 220 rather than the term "composition," as used to describe the coordination of business services in Business Component layer 210. The service composition performed within Business Process layer 210 refers to the integration of services into a business process using business logic. Service composition is performed and operates to coordinate is business flow between services, which can be represented by a business flow description language such as BPEL4WS. Performance of service composition may not result in a composite service. On the other hand, the service aggregation performed within Service layer 220 operates to implement services as individual operations in a new WSDL interface without adding any business logic between them. Business flow is not defined between services being aggregated; rather, performance of service aggregation operates to release existing services.

Generally, there are two distinct groups of services provided within a given organization: external services and internal services. External services, also known as common business services, are the services that are employed for fulfilling the business processes and goals of an organization. These services can be tied back to business processes. Business services can also be exposed to other lines of business or to the outside world of partners and the SOA environment. Internal services, on the other hand, are services that address IT integration and infrastructure problems.

In the present exemplary embodiment, Service Component layer 230 is configured to provide a code container for implementing services in Services layer 220. A service component may rely on one or more packaged applications, customer applications, and legacy systems, and can also invoke services or business processes to implement the method signatures as defined in Service layer 220. For example, a service component can be implemented in a Java class, an Enterprise Java Beans (EJB) architecture, a .Net component, etc. In addition, a service component may implement multiple methods, with some methods being exposed as services. Service layer 220, which handles binding to an actual Web service, does not handle invocation adaptation. Rather, service invocation, including input method signature transformation and output method signature adaptation, is handled by Service Component layer 230.

In the present exemplary embodiment, Service Component layer 230 is implemented to enhance service invocation and automate service invocation. Web services can only be remotely accessed through their service interfaces as defined in the ad hoc standard WSDL, and because the current WSDL specifications only expose limited information for Web services interfaces, parameter adaptations and interpretations are typically required prior to and after actual service invocations. In a WSDL service method signature, only the method name and the data types of the parameters are defined. This information is usually too generic and therefore inadequate for a program to properly invoke the target Web service, as there is no semantic information available to aid in correctly constructing input parameters. Without availability of clearly specified semantic definitions, programmers may encounter difficulties in correctly preparing input parameters and interpreting output parameters, which may lead to subsequent service invocation failures. In other words, adaptation of input parameters can ensure the correct invocation of a Web service, and interpretation and adaptation of output parameters can ensure that the values returned from the Web service are meaningful. In light of these concerns, Service Component layer 230 is configured to provide for automated input transformation and output adaptation, which is described in "Automatic Method Signature Adaptation Framework for Dynamic Web Service Invocation" (Liang-Jie Zhang, Tian Chao, Henry Chang, Jen-Yao Chung, 6th World Multi Conference on Systemics, Cybernetics and Informatics (SCI 2002), Orlando, Fla., pp. 541-546, Jul. 14-18, 2002, incorporated herein by reference thereto. Service Component layer 230 thereby operates to hide complexity upon service invocation from service requesters and facilitate direct reuse of Web services.

Referring again to FIG. 2, in the present exemplary embodiment, service model 200 is configured to provide for a bilateral service flow. In the bottom-up direction, software components from Operational System layer 240 can be used to compose service components in Service Component layer 230. These service components can then be used to compose business services in Service layer 220. These business services can then be used to compose or coordinate business processes in Business Process layer 210. In the top-down direction, business processes can be either directly decomposed as business services or used to compose business services in Service layer 220, and business processes can also be used to compose new business components in Service Component layer 230.

Figure 6:
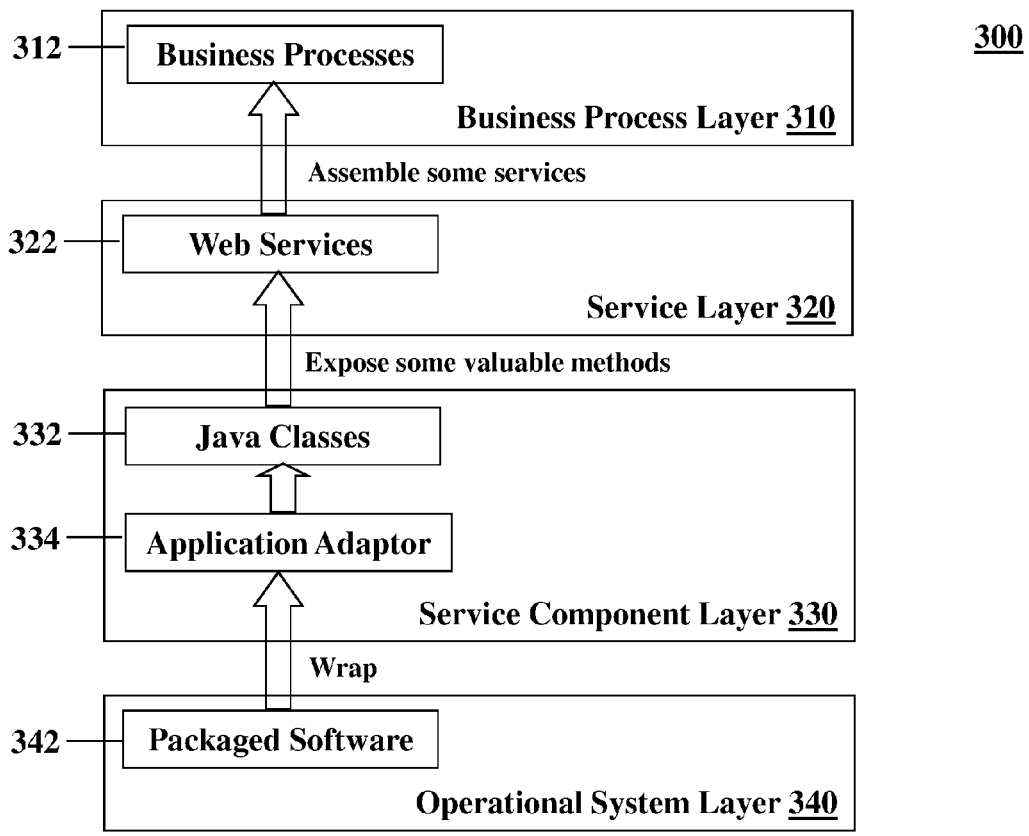
FIG. 6 is a block diagram illustrating the operational service flow of an exemplary embodiment of an SOA solution composition.

Referring now to FIG. 6, the operational service flow of an exemplary embodiment of an SOA solution composition 300 is illustrated. SOA solution composition 300 is implemented according to the exemplary embodiment of an integrated service model described in relation to FIG. 2. In the service flow of composition 300, from the bottom-up direction, packaged software components 342 from an Operational System layer 340 are wrapped by a Service Component layer 330 and integrated into reusable software components in a specific programming language, such as Java classes 332, using an application adaptor 334. Some methods from generated Java classes can be exposed to a Service layer 320 as Web services 322. Web services 322 from Service layer 320 can be selected and assembled into business processes 312 in a Business Process layer 310.

Figure 7:
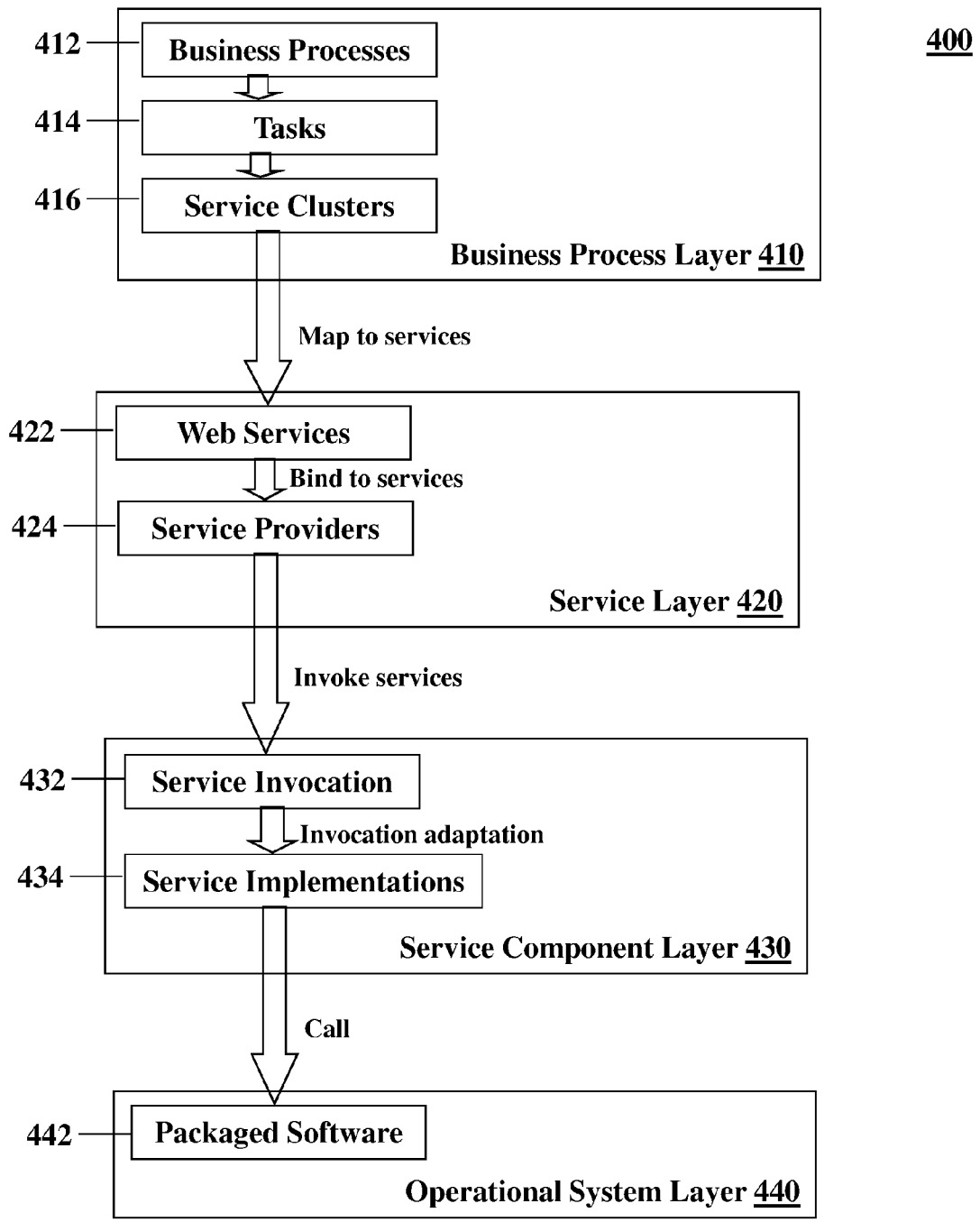
FIG. 7 is a block diagram illustrating the operational service flow of an exemplary embodiment of an SOA solution realization.

Referring now to FIG. 7, the operational service flow of an exemplary embodiment of an SOA solution realization 400 is illustrated. SOA solution realization 400 is implemented according to the exemplary embodiment of an integrated service model described in relation to FIG. 2. In the service flow SOA solution realization 400, from the top-down direction, a business process 412 is decomposed into tasks 414 and then mapped to conceptual service clusters 416 in a Business Process layer 410. Each of service clusters 416 is then mapped to actual Web services 422 in a Service layer 420 and bound to target service providers 424. A Service Component layer 420 can then perform service invocation 432 to invoke the actual service implementations 434 of the found services. Once invoked, service implementations 434 may in turn call packaged software 442 (or, alternatively, legacy systems) from an Operational System layer 440.

As shown by the examples in FIGS. 6 and 7, the exemplary embodiment of an integrated service model 200 described in relation to FIG. 2 provides a framework that can be implemented to deliver software as services at multiple levels. At a first level, packaged applications, customer applications, and legacy systems can be wrapped and published into Service layer 220 as business services, and services in the Service layer can be directly published into services registries as reusable services. At a second level, service components in Service Component layer 230 can be delivered into the Service layer as business services. At a third level, business processes formed in Business Process layer 210 can be published as composite business services in Service layer 220. Moreover, integrated service model 200 can enable and facilitate the leveraging and delivering of services as software components to compose new business service components, business services, and business processes. Integrated service model 200 provides a manner of service management that is centralized: Service layer 220 is the sole point of publishing business-oriented services into public service registries. That is, business processes, service components, and existing software products are processed through the governance and management of Service layer 220 before being published as business services.

Referring again to the exemplary embodiment illustrated in FIG. 2, the separation of integrated service model 200 into logical layers can enable and facilitate a fine-grained service-oriented manageability. Integrated service model 200 can thereby be utilized to not only hide the complexity of leveraging existing applications in delivering services, but also facilitate the leveraging of existing applications as reusable assets for constructing new business services and coordinating multiple business processes. As will be described below, underlying integrated service model 200 is a metamodel consisting of layers, fine-grained architectural elements called Architectural Building Blocks (ABBs) in each of the three layers, relations between ABBs and layers, interaction patterns, options, and architectural decisions that can be used to guide a software architect in the creation of an SOA solution.

According to "SOA Solution Stack Community Paper" (SOA Solution Stack team, version 1.28, November 2005), which is incorporated herein by reference thereto, in a typical SOA architecture, there are several key elements for providing a context that can support effective and efficient service delivery: a Consumer layer, an Integration layer, a Quality of Service (QoS) layer, a Data Architecture layer, and a Governance layer. In accordance with the present invention, FIG. 8 illustrates an exemplary embodiment of an integrated SOA service model 500 that incorporates these surrounding elements.

In the present exemplary embodiment, a Consumer layer 550 is provided as a presentation layer that leverages a Business Process layer 510 and a Service layer 520 to quickly construct the user interfaces of business services to fulfill customer requirements. An Integration layer 555 provides service model 500 with the capability to mediate, route, and transform service requests between service requestors and service providers. A Quality of Services (QoS) layer 560 enables solution-level QoS management in various ways, such as providing availability, performance, reliability, maintainability, testability, and fault tolerance. A Data Architecture layer 565 provides a unified representation and enablement framework that integrates with domain-specific data architecture to facilitate value chain integration. A Governance layer 570 provides design guidance to ensure a proper design for the SOA solution architecture. Governance layer 570 can also be implemented to aid in establishing best practices or their references (for example, Center of Excellence of SOA/Web services), principles for SOA solution design and development, and principles for monitoring the system and handling exceptions during runtime.

Figure 8:
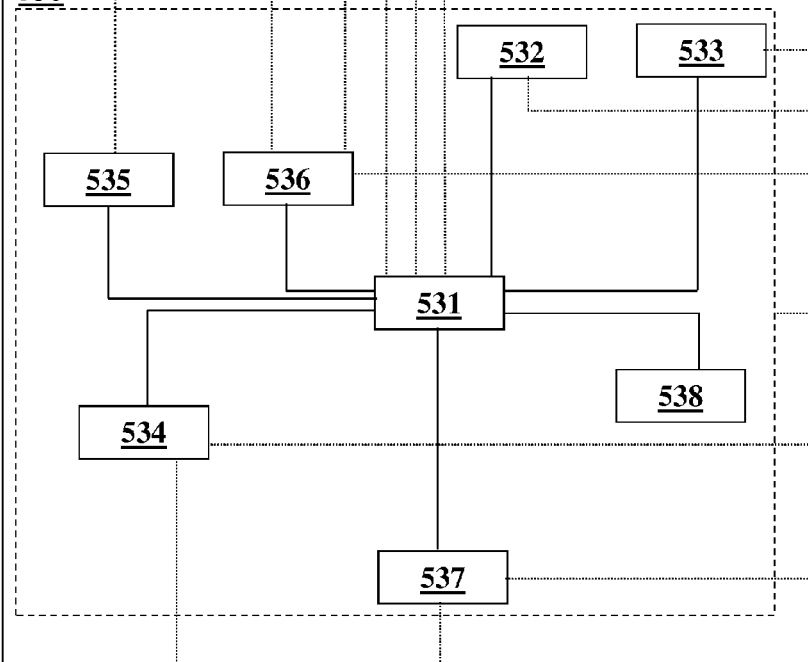
FIG. 8 is a block diagram illustrating an exemplary embodiment of an integrated SOA service model in accordance with the present invention, shown incorporating a set of ABBs within a Service Component layer.

In FIG. 8, integrated SOA service model 500 is also shown as incorporating a set of ABBs within Service Component layer 530. More specifically, eight fundamental architectural building blocks (ABBs) are provided for in a Service Component layer 530 in FIG. 8: (1) a service implementation module ABB 531, (2) a method input transformation ABB 532, (3) a method output adaptation ABB 533, (4) a service deployment module ABB 534, (5) a service publishing module ABB 535, (6) a service invoker ABB 536, (7) an application adaptation module ABB 537, and (8) a service component repository ABB 538.

Service implementation module ABB 531 is responsible for managing the actual implementation (that is, actual programming code in various languages such as, for example, Java, .NET, C++, etc.) of service components in Service Component layer 530. Service implementation module ABB 531 is configured to interact with each of the other ABBs identified within Service Component layer 530 and thereby acts as a controller for the Service Component layer.

Method input transformation ABB 532 is responsible for properly constructing or transforming the input parameters of method or operation signatures prior to invocation of a service component. For example, method input transformation ABB 532 may convert a weight measurement specified in kilograms by the solution environment to the corresponding weight measurement in pounds as required by an input parameter to a method of a service component to be invoked.

Method output adaptation ABB 533 is responsible for transforming the returned output parameters of method signatures in accordance with the specifications of the solution environment following invocation of a service component.

Service deployment module ABB 534 is responsible for deploying the actual implementations of service components to corresponding deployment platforms. For example, service deployment module ABB 534 can be configured to manage the deployment descriptors of service components. In exemplary embodiments, service deployment module ABB 534 can comprise an XML-based deployment script or utilities for a Web application server.

Service publishing module ABB 535 is responsible for publishing service components to a service registry ABB in Service layer 520 by directly interacting with a service interaction manager ABB in the Service layer.

Service invoker ABB 536 is responsible for invoking service components, services, or packaged applications.

Application adaptation module ABB 537 is responsible for adapting bottom-up packaged applications from Operational System layer 540 for service implementation module ABB 531 in Service Component layer 530. Application adaptation module ABB 537 thereby enables the packaged applications to be treated as reusable service components.

Service component repository ABB 538 is responsible for storing information regarding the service components retrievable from (that is, registered with) Service Component layer 530.

Service component repository ABB 538 enables Service Component layer 530 to find available service components for potential reuse before integration with legacy services.

The relationships between the identified ABBs in Service Component layer 530 are indicated by solid lines in FIG. 8. In the present exemplary embodiment, certain relationships also exist between the identified ABBs within Service Component layer 530 and the other layers of integrated SOA service model 500, as indicated by the diamond-pattern lines in FIG. 8. For example, the service implementation module ABB is configured to interact with Consumer layer 550, Business Process layer 510, and Service layer 520; the service invoker ABB is configured to interact with Business Process layer 510, Service layer 520, and Integration layer 555; the service publishing module ABB is configured to interact with Service layer 520; the service deployment module ABB and the application adaptation module ABB are configured to interact with Operational System layer 540; and the method input transformation ABB and the method output adaptation ABB are configured to interact with Data Architecture layer 565. Furthermore, each of the identified ABBs in Service Component layer 530 is configured to interact with Governance layer 570.

To further illustrate the relationships of the ABBs in Service Component layer 530, one exemplary embodiment of a dynamic interaction pattern between the ABBs can involve an information retrieval process performed by taking the following actions: (1) Service layer 520 sends a request for a service to the service implementation module ABB; (2) the service implementation module ABB sends a request to the method input transformation ABB to transform input parameters; (3) the method input transformation ABB replies to the service implementation module ABB by returning transformed input parameters; (4) the service implementation module ABB sends a request to the service component repository ABB to check for available service components; (5) the service component repository ABB replies to the service implementation module ABB by returning available service components; (6) the service implementation module ABB sends a request to the application adaptation module ABB to check for available legacy services; (7) the application adaptation module ABB replies to the service implementation module ABB by returning available legacy services; (8) the service implementation module ABB sends a request to the service invoker ABB to invoke a service (9) the service invoker ABB replies to the service implementation module ABB by returning output parameters from the invoked service; (10) the service implementation module ABB sends a request to the method output transformation ABB to transform the output parameters; (11) the method output transformation ABB replies to the service implementation module ABB by returning transformed output parameters; and (12) the service implementation module ABB replies to the Service layer.

It should be noted the preceding exemplary interaction pattern is non-limiting, and that the information retrieval performed across the ABBs in Service Component layer 530 in exemplary embodiments can be customized, as well as reconfigured, to follow other interaction patterns in accordance with various business requirements.

Figure 9:
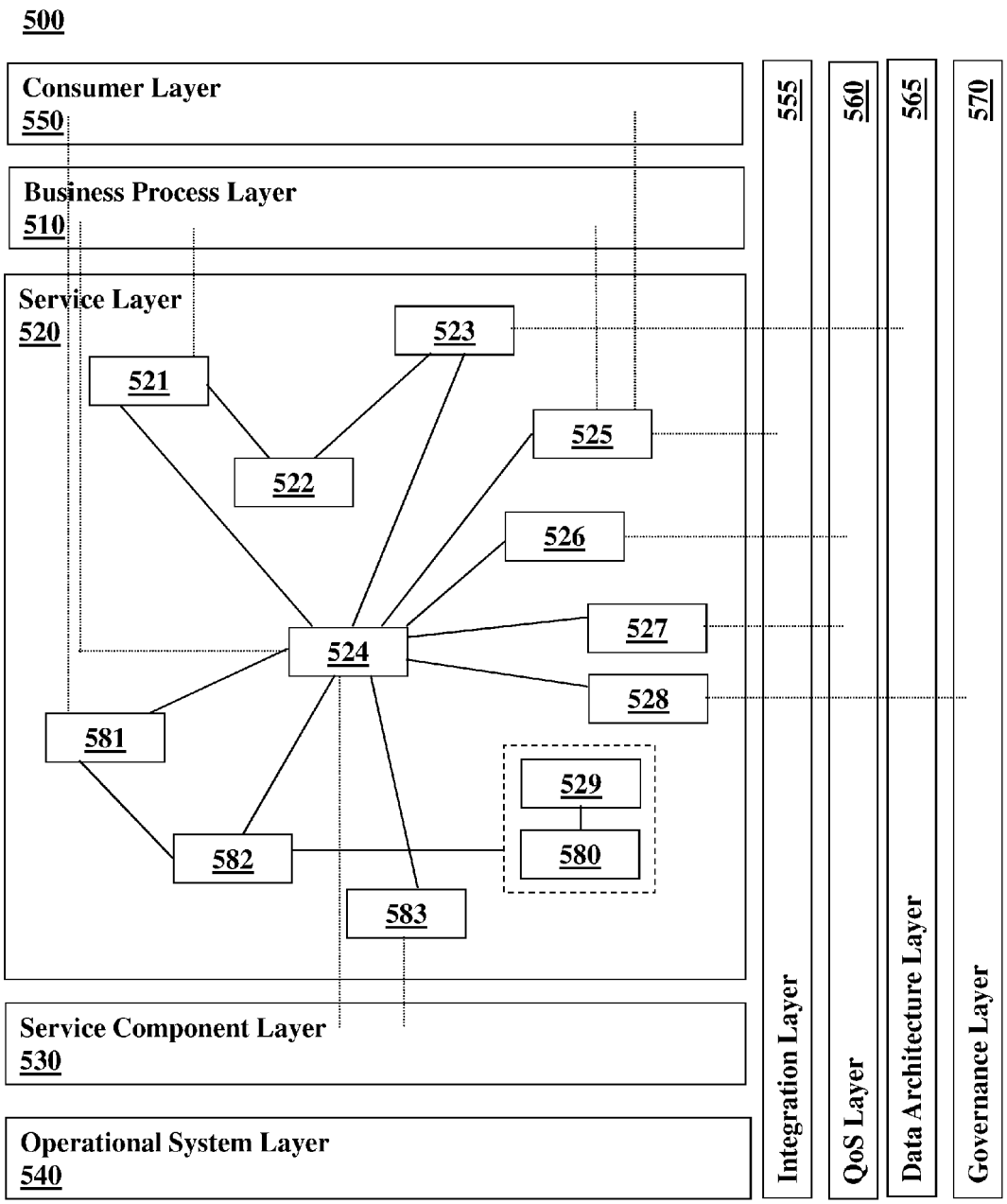
FIG. 9 is a block diagram illustrating the exemplary integrated SOA service model of FIG. 8, shown incorporating a set of ABBs within a Service layer.

Referring now to the exemplary embodiment illustrated in FIG. 9, integrated SOA service model 500 is shown as incorporating a set of ABBs within Service layer 520. More specifically, thirteen fundamental ABBs are provided for in Service layer 520 in FIG. 9: (1) a service cluster ABB 521, (2) a service ABB 522, (3) a services registry ABB 523, (4) a service interaction manager ABB 524, (5) a service binder ABB 525, (6) a policy ABB 526, (7) an access control ABB 527, (8) a state manager ABB 528, (9) a service provider ABB 529, (10) a service aggregator ABB 580, (11) a service consumer ABB 581, (12) a service broker ABB 582, and (13) an interface aggregator ABB 583.

A service cluster ABB does not represent a specific service; rather, it represents a conceptual-level concept of services as a cluster (that is, set) of services offering the similar functionalities. Using Java terminology, a service cluster ABB can be viewed as an interface of a set of implemented classes (that is, embodied services).

A service ABB represents a published service that offers certain functionalities. Typically, a service is published to a service registry to be found by service consumers searching for the functionalities offered by the service. A service is typically represented in a standard description language (for example, WSDL) that describes the accessible interfaces of the service (for example, function or method signatures). Because a service cluster represents a set of services having the same functionalities, there is a one-to-many relationship between a service cluster ABB and service ABBs.

A service registry ABB represents a service repository that stores information on a set of published services and can be queried by service consumers ABBs. Typically, this information can include the service interface information (for example, service names and accessible operations with invocation signatures) and maybe some service providers' information (for example, business name, contact information, and development team information). Typically, the published services' information is organized by categories to facilitate service discovery. A service consumer queries a service registry for interested services, and then uses the found network addresses of the service providers to invoke the services from the corresponding service providers. Because a service registry is a repository for multiple registered services, there is a many-to-one relationship between service ABBs and a service registry ABB.

The service interaction manager ABB represents the central managing unit of Service layer 520. As shown in FIG. 9, the service interaction manager ABB manages all ABBs identified in Service layer 520. In addition to providing a centralized management of Service layer 520, the service interaction manager ABB also enables loose coupling between the identified ABBs in the Service layer to provide for the flexibility, extensibility, and reusability of the ABBs. The service interaction manager ABB, by interacting with each of the other ABBs implemented within Service layer 520, is configured to act as a controller for the Service layer. Thus, the relationship between the service interaction manager ABB and the other identified ABBs within Service layer 520 is a one-to-many relationship, meaning that there is only one service interaction manager ABB in the Service layer that controls all other Service layer ABBs.

A service binder ABB is responsible for finding the proper services offered by service providers and binding to the actual services.

A policy ABB is responsible for policies that regulate the behaviors of the identified ABBs in the Service layer. Typically, services, service providers, and service consumers each implement specific policies to formalize their behaviors and enable effective management. For example, policies for implementing services can include both functional and non-functional aspects based upon a common set of ground rules, which may be derived from multiple sources, such as, for example, IT best practices, customer-specific requirements, and IBM internal practices promoting asset reuse. For example, a policy covering a functional aspect may be one that specifies a particular standard messaging format to be employed by a group of services to ensure future reusability of these services. An example of a policy covering a non-functional aspect may be one that specifies a certain level of availability of a particular service over a certain period of time. Policies for service consumers can define specific constraints or patterns of how the business entity may interact with other business entities, services, or business processes. For example, customer A may not want to use services provided by company B. Policies for service providers can define patterns and constraints that capture business relationships between the service providers with other entities and services. For example, a service provider A may form an alliance with another service provider B, so that they tend to collaborate with each other. A description of the detailed relationship modeling is provided in "Web Services Relationships Binding for Dynamic e-Business Integration" (Liang-Jie Zhang, Henry Chang, Tian Chao, International Conference on Internet Computing (IC2002), pp. 561-567, June, 2002), which is incorporated herein by reference thereto.

An access control ABB is responsible for providing authentication and/or authorization capabilities (enabled through QoS layer 560) for use by the service interaction manager ABB to grant proper access privileges for published services in Service layer 520.

A state manager ABB is responsible for providing state management of the identified ABBs in Service layer 520. A comprehensive business transaction typically requires an environment having state instead of simple stateless services. A state manager ABB allows an identified ABB to carry a set of attributes with values across conversational events.

A service provider ABB represents a business entity that owns one or more services defined in this layer. More specifically, a service provider ABB represents an owner of primitive services, rather than a service aggregator (that is, an owner of composite services). In exemplary embodiments, a service provider ABB can perform two key operations: (1) publishing a service in a service registry and (2) providing a service invocation interface and a deployed implementation module.

A service aggregator ABB represents a business entity that owns one or more composite services defined in Service layer 520. In contrast with a typical service provider that offers individual services, a service aggregator ABB compiles published individual services into composite services. It should be noted, however, that, as shown in FIG. 9, from the perspective of a service consumer ABB, a service aggregator ABB is viewed a typical service provider. Therefore, a service aggregator ABB can be viewed as a subclass of service provider ABBs that inherits the interfaces and operations defined for service provider ABBs with an additional operation that aggregates existing services. Because a service aggregator is implemented to create a new service from multiple service providers, and because a service provided by a service provider can be used by multiple services aggregators as a service component, there is a many-to-many relationship between service provider ABBs and service aggregator ABBs.

A service consumer ABB represents the business entities that invoke and use one or more services defined in Service layer 520. Thus, a service consumer ABB can represent, for example, an entire enterprise, a department, a group of people within the enterprise identified by a particular role, or an individual. In exemplary embodiments, the specific granularity at which a service consumer ABB can be implemented is ultimately dependent on the nature and scope of the corresponding SOA architecture. In exemplary embodiments, a service consumer ABB can perform two key operations: (1) searching for a service in a service registry and (2) binding to and consuming a specific service.

A service broker ABB acts as a broker between service provider ABBs and service consumer ABBs, as well as between service provider ABBs and service aggregator ABBs. In more detail, a service broker ABB can aid service consumer ABBs in discovering interested services and locating corresponding service provider ABBs. Because a service broker represents multiple service consumers, there is a many-to-one relationship between service consumer ABBs and a service broker ABB. Because a service broker can access multiple service providers and service aggregators, there is a many-to-one relationship between service provider and service aggregator ABBs and a service broker ABB.

An interface aggregator ABB is responsible for performing interface-level service aggregation, aggregating service interfaces into a new service interface, without any business logic involved. Each component service thus becomes an individual operation in the aggregated WSDL definitions.

In exemplary embodiments, a service consumer ABB can be configured to directly bind to a service provider ABB for an interested service. In other exemplary embodiments, to realize higher reusability, flexibility, and extensibility of the identified ABBs in Service layer 520, these ABBs can be loosely coupled and only interact with each other through other ABBs within the Service layer (that is, via the service interaction manager ABB) or other layers (for example, Integration layer 555 or the QoS layer 560).

The relationships between the identified ABBs in Service layer 520 are indicated by solid lines in FIG. 9. In the present exemplary embodiment, certain relationships also exist between the identified ABBs within Service layer 520 and the other layers of integrated SOA service model 500, as indicated by the diamond-pattern lines in FIG. 9. For instance, a service interaction manager ABB is configured to interact with Business Process layer 510 and Service Component layer 530; an interface aggregator ABB is configured to interact with the Service Component layer; a service cluster ABB is configured to interact with the Business Process layer; a service registry ABB is configured to interact with Data Architecture layer 565; a service binder ABB is configured to interact with the Business Process layer, Consumer layer 550, and Integration layer 555; a service consumer ABB is configured to interact with the Consumer layer; a policy ABB and a access controller ABB are configured to interact with the QoS layer; and a state manager ABB is configured to interact with the Governance layer.

In exemplary embodiments, the service interaction manager ABB can be configured to directly interact with Operational System layer 540. In other exemplary embodiments, the service interaction manager ABB and the Operational System layer can indirectly interact with each other through other layers, such as the Integration layer or the Data Architecture layer.

To further illustrate the relationships of the identified ABBs in Service layer 520, one exemplary embodiment of a dynamic interaction pattern between the ABBs can involve an information retrieval process performed by taking the following actions: (1) Business Process layer 510 sends a request for a service to the service interaction manager ABB; (2) the service interaction manager ABB sends a request to the policy ABB; (3) The policy ABB replies to the service interaction manager ABB; (4) the service interaction manager ABB sends a request to the access controller ABB; (5) the access controller ABB replies to the service interaction manager ABB; (6) the service interaction manager ABB sends a request to the state manager ABB; (6) the state manager ABB replies to the service interaction manager ABB; (7) the service interaction manager ABB sends a request to the service cluster ABB; (8) the service cluster ABB sends a request to check the service registry ABB; (9) the service registry ABB replies to the service cluster ABB; (10) the service cluster ABB sends a request to the service ABB; (11) the service ABB replies to the service cluster ABB; (12) the service cluster ABB replies to the service interaction manager ABB; (13) the service interaction manager ABB sends a request to the service broker ABB; (14) the service broker ABB replies to the service interaction manager ABB; (15) the service interaction manager ABB sends a request to the service provider ABB (or the service aggregator ABB); (16) the service provider ABB (or the service aggregator ABB) replies to the service interaction manager ABB; (17) the service interaction manager ABB sends a request to the service binder ABB to bind to the actual service; and (18) the service binder ABB replies to the service interaction manager ABB.

It should be noted the preceding exemplary interaction pattern is non-limiting, and that the information retrieval performed across the ABBs in Service Component layer 530 in exemplary embodiments can be customized, as well as reconfigured, to follow other interaction patterns in accordance with various business requirements.

Figure 10:
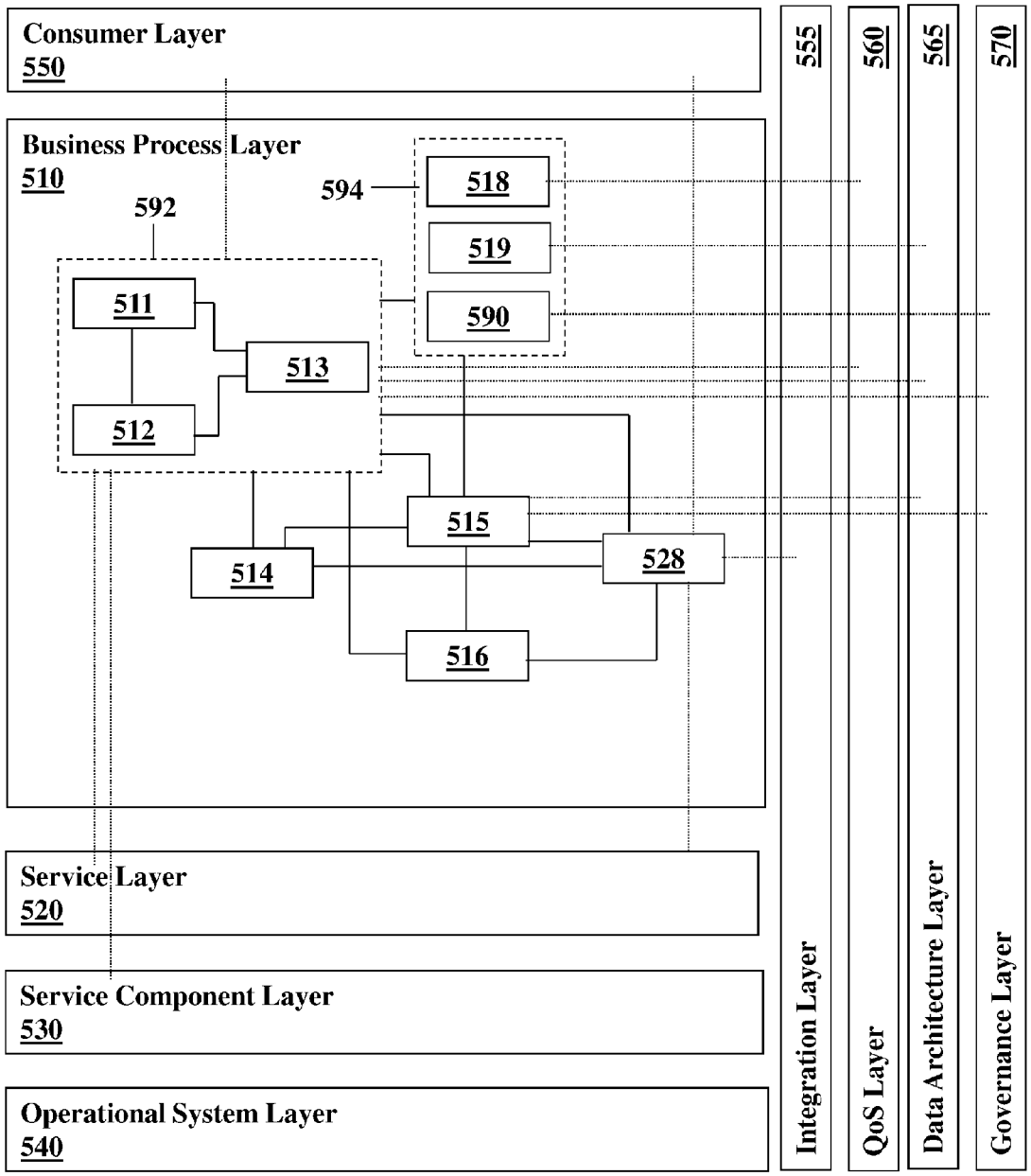
FIG. 10 is a block diagram illustrating the exemplary integrated SOA service model of FIG. 8, shown incorporating a set of ABBs within a Business Process layer.

Referring now to the exemplary embodiment illustrated in FIG. 10, integrated SOA service model 500 is shown as incorporating a set of ABBs within Business Process layer 510. More specifically, ten fundamental ABBs are provided for in Business Process layer 510 in FIG. 10: (1) a process decomposition module ABB 511, (2) a service composition module ABB 512, (3) a process collaboration controller ABB 513, (4) a data flow ABB 514, (5) a process compliance module ABB 515, (6) a process repository ABB 516, (7) a process service adapter ABB 517, (8) an access control ABB 518, (9) a configuration rule ABB 519, and (10) a state management module ABB 590. As shown in FIG. 10, process decomposition module ABB 511, service composition module ABB 512, and process collaboration controller ABB 513 belong to a generic control flow ABB 592; and access control ABB 518, configuration rule ABB 519, and state management module ABB 590 belong to a generic utility helper ABB 594. There is a one-to-one mapping relationship between a control flow ABB and a utility helper ABB.

A process decomposition ABB is responsible of dividing a business process into smaller units, each being able to match to a service cluster (discussed in detail above with reference to Service layer 520).

A service composition ABB is responsible for aggregating services as a business process in the bottom-up direction. In exemplary embodiments, the final aggregation of services is represented in BPEL or other flow markup languages. In exemplary embodiments, a service composition ABB may perform a service or process discovery phase that is guided by performance metrics derived from customer requirements and/or historical QoS data to find and select reusable services. Because a combination of the locally optimal services may not be the globally optimal one in exemplary embodiments, a service composition ABB may also be configured to implement a flow optimization facility.

A process collaboration building block ABB handles the collaboration patterns between processes using business logic to define the sequences and contents of messages exchanged in the service-oriented collaboration environment. More particularly, message exchange patterns that can include predefined reusable messages such as Request for Quote (RFQ) and Request for Service (RFS), as well sequences of these messages, can serve as business protocols. Such predefined messages are described in "On-demand business collaboration enablement with web services" (John Y. Sayah, Liang-Jie Zhang, Decision Support Systems 40(1): 107-127, 2005), which is incorporated herein by reference thereto. Each message may include one or more message units defined by schema. For example, a RFQ message may include an RFQ request message unit, an RFQ acknowledgement message unit, and an RFQ response message unit. The message units are created to carry information for business resources (for example, site, organization, project, task, process, document, role player, etc.) for achieving a certain business goal. In exemplary embodiments, commonly used terms can be defined in a dictionary or ontology. There is a one-to-one mapping relationship between a process decomposition ABB, a service composition ABB, and a process collaboration controller ABB that is realized by a generic control flow ABB.

In exemplary embodiments, a process collaboration controller ABB should also provide process chorography resources (for example, project, task, requirement, opportunity, virtual team, etc.) that provide the vocabulary for business collaborations. In exemplary embodiments, these resources may be represented using the WS-Resources standard. In exemplary embodiments, process chorography resources can also contain cross-links to each other using endpoint references. For example, a project may refer to a set of tasks, and a task may refer to a set of requirements. In exemplary embodiments, a set of relationships may also be defined for composition, aggregation, inheritance, and association for WS-Resources.

A data flow ABB is responsible for managing data transactions and transformations between services and processes. There is a one-to-one mapping relationship between a control flow ABB and a data flow ABB.

A process compliance ABB is responsible for ensuring that a business process complies with predefined requirements. A process compliance ABB may provide for mapping, monitoring, management, law enforcement, and versioning. Mapping can be used to ensure that a business process is aggregated by existing services based on industry standards. This functionality is analogical to using Partner Interface Processes (PIPs) in RosettaNet, an industry standards-based business process mapping protocol. A process compliance ABB can be implemented to ensure that a business process has embedded performance metrics or KPIs to provide for run-time monitoring and proper handling of run-time exceptions. Law enforcement can be used to ensure that a business process complies with predefined rules or policies. For example, a process compliance ABB can be implemented to ensure that the annual reports of a firm comply with the financial reporting disclosure requirements of the Sarbanes-Oxley Act (SOX) management report on internal control. Versioning can be used to ensure that backward compatibility is assured. There is a one-to-one mapping relationship between a process compliance ABB and each of a control flow ABB, a data flow ABB, a utility helper ABB, a process repository ABB, and a process service adapter ABB.

A process repository ABB is responsible for storing a set of reusable business processes in a retrievable asset repository. In exemplary embodiments, a process repository ABB may be categorized by various criteria, such as by business functions or by vendors. There is a one-to-many mapping relationship between a control flow ABB and a process repository ABB.

A process service adapter ABB is responsible for externalizing a business process as a Web service so that the business process can be discovered and used as a common service in Service layer 520 or other layers (for example, Integration layer 555). There is a one-to-one mapping relationship between a process service adapter ABB and each of a process repository ABB and a utility helper ABB.

An access control ABB is responsible for authorization and authentication of available business processes.

A configuration rule ABB is responsible for hosting rules that dictate how the ABBs can be configured based on various scenarios. The more fine-grained an ABB is, the more flexible the ABB will be to being configured based on specified rules.

A state management ABB is responsible for recording and tracking business process interactions. In exemplary embodiments, a state management ABB can maintain this data for the duration of an entire business process. There is a one-to-one mapping relationship between an access control ABB, a configuration rule ABB, and a state management module ABB that is realized by a utility helper ABB.

The relationships between the identified ABBs in Business Process layer 510 are indicated by solid lines in FIG. 10. In the present exemplary embodiment, certain relationships also exist between the identified ABBs within Business Process layer 510 and the other layers of integrated SOA service model 500, as indicated by the diamond-pattern lines in FIG. 10. For example, a control flow ABB is configured to interact with Consumer layer 550, Service layer 520, Service Component layer 530, QoS layer 560, Data Architecture layer 565, and Governance layer 570; a process service adapter ABB is configured to interact with the Consumer layer, the Service layer, and Integration layer 555; a process compliance ABB is configured to interact with the Data Architecture layer and the Governance layer; an access control ABB is configured to interact with the QoS layer; a configuration rule ABB is configured to interact with the Data Architecture layer; and a state management controller ABB is configured to interact with the Governance layer.

In exemplary embodiments, the service interaction manager ABB can be configured to directly interact with Operational System layer 540. In other exemplary embodiments, the service interaction manager ABB and the Operational System layer can indirectly interact with each other through other layers, such as the Integration layer or the Data Architecture layer.

To further illustrate the relationships of the identified ABBs in Business Process layer 510, one exemplary embodiment of a dynamic interaction pattern between the ABBs can involve an information retrieval process performed by taking the following actions: (1) Consumer layer 550 sends a request to configuration rule ABB to check availability of ABBs; (2) the configuration rule ABB replies to the Consumer layer; (3) the Consumer layer imports a design model to the process collaboration controller ABB; (4) the process collaboration controller ABB sends a request to the process repository ABB to check available processes; (5) the process repository ABB replies to the process collaboration controller ABB with available processes; (6) the process collaboration controller ABB forwards the request to the process decomposition module ABB; (7) the process decomposition module ABB sends a request to the process repository ABB for existing processes; (8) the process repository ABB replies to the process decomposition module ABB for available processes; (9) the process decomposition ABB conducts process decomposition; (10) the process decomposition ABB obtains the process decomposition results; (11) the process decomposition ABB returns the decomposition results to the process collaboration controller ABB; (12) the process collaboration controller ABB sends a request to the process compliance module ABB to check the compliance of the decomposed processes; (13) the compliance module ABB replies to the process collaboration controller ABB; (14) the process collaboration controller ABB defines the control flow (that is, the execution order) of processes by itself; (15) the process collaboration controller ABB finishes the definition of the control flow of the processes; (16) the process collaboration controller ABB sends a request to the data flow ABB for data flow configuration information between the processes; (17) the data flow ABB replies to the process collaboration controller ABB with the data flow information within control flow ABB; (18) the process collaboration controller ABB sends a request to the access control ABB to check access privileges of the processes; (19) the access control ABB replies to the process collaboration controller ABB; (20) the process collaboration controller ABB sends a request to the state management ABB to check state information of processes; (21) the state management ABB replies to the process collaboration controller ABB; (22) the process collaboration controller ABB sends a request to the process composition module ABB to compose the processes; (23) the process composition module ABB replies to the process collaboration controller ABB; (24) the process collaboration controller ABB sends a request to the process service adapter ABB to expose processes as services; (25) the process service adapter ABB replies to the process collaboration controller ABB; (26) the process collaboration controller ABB replies to the Consumer layer with the composed processes; (27) the Consumer layer sends a request to the process service adapter ABB to invoke the processes; and (28) the process service adapter ABB replies to the Consumer layer.

It should be noted the preceding exemplary interaction pattern is non-limiting, and that the information retrieval performed across the ABBs in Business Process layer 510 in exemplary embodiments can be customized, as well as reconfigured, to follow other interaction patterns in accordance with various business requirements.

Exemplary embodiments of the present invention can be utilized in the design and implementation of SOA solutions by providing roadmaps and guidelines for architectural, design, and implementation decisions, and by providing patterns and insights for integrating these aspects. Exemplary embodiments can be implemented to create reusable assets that enable end-to-end, SOA-based business solutions that can cover enterprise modeling, business process modeling, service modeling, as well as integration and management of business applications. In exemplary embodiments, this design and implementation can be business-process-driven, tool-based architecture-driven, or data-access-based (starting with information or data services), and can begin with message-based application integration through service-oriented integration, with legacy encapsulation and wrapping, or with legacy componentization and transformation. In exemplary embodiments, this design and implementation can leverage existing technologies and components that have an associated set of best practices that are not specifically related to SOA. For example, J2EE applications and components can be important parts of SOA solutions.

Exemplary embodiments of the present invention can be implemented to provide an abstract, layered and logical design of an SOA that has applicability to various types of architect-practitioners, such as enterprise architects, solution architects, and so forth. Architects can employ exemplary embodiments as a check list of layers, ABBs and their relations in each layer, the options available to them, and decisions that need to be made at each layer. The layers provide a starting point for the separation of concerns needed to build an SOA. Enterprise architecture can employ exemplary embodiments as a blueprint that will be customized or instantiated for each line of business or each product line (depending on how the organization is structured).

Exemplary embodiments of the present invention can be utilized in the design and implementation of SOA solutions within an expanding range as a result of the self-similarity of the application of SOA concepts recursively within larger or smaller scopes. For example, SOA can start within a single project, expand to meet the needs of a line of business or a few lines of business sharing services, and then be expanded to an enterprise scale, a supply chain, or even a larger SOA ecosystem. In each case the principles of SOA tend to be applied in a similar manner.

Exemplary embodiments of the present invention can take the form of an entirely hardware embodiment, an entirely software embodiment, or an embodiment including both hardware and software elements. In exemplary embodiments implemented in software, the software can include, but is not limited to, firmware, resident software, microcode, etc.

Furthermore, exemplary embodiments can take the form of a computer program product accessible from a computer-usable or computer readable medium providing program code for use by or in connection with a computer or any instruction execution system. In exemplary embodiments, a computer-usable or computer-readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Examples of optical disks include read only memory compact disk (CD-ROM), read/write compact disk (CD-R/W) and DVD.

In exemplary embodiments, a data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

In exemplary embodiments, network adapters may also be coupled to the system to enable the data processing system to become coupled to other data processing systems or remote printers or storage devices through intervening private or public networks. Modems, cable modems, and Ethernet cards are just a few of the currently exemplary types of network adapters.

Although exemplary embodiments of the present invention have been described in detail, it should be understood that various changes, substitutions and alternations can be made therein without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A method for designing and developing a service oriented architecture solution, the method comprising:
   implementing a business process layer having a first set of architectural building blocks and configured to perform service composition and service decomposition;
   implementing a service component layer having a second set of architectural building blocks and configured to perform service integration and service invocation;
   implementing a service layer having a third set of architectural building blocks and configured to perform service discovery, service decomposition, and service aggregation, wherein the third set of architectural building blocks includes a service implementation module architectural building block, a method input transformation architectural building block, a method output adaptation architectural building block, a service deployment module architectural building block, a service publishing module architectural building block, a service invoker architectural building block, an application adaptation module architectural building block, and a service component repository architectural building block;
   integrating the business process layer, the service component layer, and the service layer;

specifying a set of characteristics of the first, second, and third sets of architectural building blocks to be reconfigurable based upon extensible rules;

integrating the business process layer, the service component layer, and the service layer with a consumer service layer, an integration layer, a quality of service layer, a data architecture layer, and a governance layer;

integrating the business process layer, the service component layer, and the service layer with an operational system layer providing a set of service applications;

implementing the service implementation module architectural building block interact with the consumer layer, the business process layer, and the service layer;

implementing the service invoker architectural building block to interact with the business process layer, the service layer, and the integration layer; implementing the service publishing module architectural building block to interact with the service layer;

implementing the service deployment module architectural building block and the application adaptation module architectural building block to interact with the operational system layer;

implementing the method input transformation architectural building block and the method output adaptation architectural building block to interact with the data architecture layer; and implementing each architectural building block of the third set of architectural building blocks to interact with the governance layer.

2. A method for designing and developing a service oriented architecture solution, the method comprising:

implementing a business process layer having a first set of architectural building blocks and configured to perform service composition and service decomposition;

implementing a service component layer having a second set of architectural building blocks and configured to perform service integration and service invocation, wherein the second set of architectural building blocks includes a service cluster architectural building block, a service architectural building block, a services registry architectural building block, a service interaction manager architectural building block, a service binder architectural building block, a policy architectural building block, an access control architectural building block, a state manager architectural building block, a service provider architectural building block, a service aggregator architectural building block, a service consumer architectural building block, a service broker architectural building block, and an interface aggregator architectural building block;

implementing a service layer having a third set of architectural building blocks and configured to perform service discovery, service decomposition, and service aggregation;

integrating the business process layer, the service component layer, and the service layer;

specifying a set of characteristics of the first, second, and third sets of architectural building blocks to be reconfigurable based upon extensible rules;

integrating the business process layer, the service component layer, and the service layer with a consumer layer, an integration layer, a quality of service layer, a data architecture layer, and a governance layer;

integrating the business process layer, the service component layer, and the service layer with an operational system layer providing a set of service applications;

implementing the service interaction manager architectural building block to interact with the business process layer and the service component layer;

implementing the interface aggregator architectural building block to interact with the service component layer;

implementing the service cluster architectural building block to interact with the business process layer;

implementing the service registry architectural building block to interact with data architecture layer;

implementing the service binder architectural building block to interact with the business process layer, the consumer layer, and the integration layer;

implementing the service consumer to interact with the consumer layer;

implementing the policy architectural building block and the access controller architectural building block to interact with the quality of service layer; and implementing the state manager architectural building block to interact with the governance layer.

3. A method for designing and developing a service oriented architecture solution, the method comprising:

implementing a business process layer having a first set of architectural building blocks and configured to perform service composition and service decomposition, wherein the first set of architectural building blocks includes a process decomposition module architectural building block, a service composition module architectural building block, a process collaboration controller, a data flow architectural building block, a process compliance module architectural building block, a process repository architectural building block, a process service adapter architectural building block, an access control architectural building block, a configuration rule architectural building block, and a state management module architectural building block;

implementing a service component layer having a second set of architectural building blocks and configured to perform service integration and service;

implementing a service layer having a third set of architectural building blocks and configured to perform service discovery, service decomposition, and service aggregation;

integrating the business process layer, the service component layer, and the service layer;

specifying a set of characteristics of the first, second, and third sets of architectural building blocks to be reconfigurable based upon extensible rules;

integrating the business process layer, the service component layer, and the service layer with a consumer service layer, an integration layer, a quality of service layer, a data architecture layer, and a governance layer;

integrating the business process layer, the service component layer, and the service layer with an operational system layer providing a set of service applications;

implementing the control flow architectural building block to interact with the consumer layer, the service layer, the service component layer, the quality of service layer, the data architecture layer, and the governance layer; implementing a process service adapter architectural building block to interact with the consumer layer, the service layer, and the integration layer; implementing a process compliance architectural building block to interact with the data architecture layer and the governance layer; implementing an access control architectural building block to interact with the quality of service layer; implementing a configuration rule architectural building block to interact with the data architecture layer; and implementing a state management controller architectural building block to interact with the governance layer.

* * * * *